United States Patent
Mizusawa

(10) Patent No.: US 7,248,404 B2
(45) Date of Patent: Jul. 24, 2007

(54) MICROSCOPE

(75) Inventor: Masayuki Mizusawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 1 day.

(21) Appl. No.: 11/125,320

(22) Filed: May 10, 2005

(65) Prior Publication Data

US 2005/0254123 A1 Nov. 17, 2005

(30) Foreign Application Priority Data

May 17, 2004 (JP) .............................. 2004-146066

(51) Int. Cl.
*G02B 21/06* (2006.01)
*G02B 21/00* (2006.01)
(52) U.S. Cl. ...................... 359/385; 359/368; 359/381; 359/388
(58) Field of Classification Search ........ 359/368–390, 359/618–619, 641–642; 351/200–247
See application file for complete search history.

(56) References Cited

U.S. PATENT DOCUMENTS

| 4,063,797 A | * | 12/1977 | Taira ........................... 359/385 |
| 4,852,985 A | * | 8/1989 | Fujihara et al. ............. 359/387 |
| 5,513,201 A | * | 4/1996 | Yamaguchi et al. .......... 372/75 |
| 5,777,784 A | * | 7/1998 | Tanaka ........................ 359/388 |
| 5,923,475 A | * | 7/1999 | Kurtz et al. ................. 359/619 |
| 6,134,002 A | * | 10/2000 | Stimson et al. ............. 356/326 |
| 6,245,507 B1 | * | 6/2001 | Bogdanov ....................... 435/6 |
| 6,507,434 B2 | | 1/2003 | Miyashita ................... 359/387 |
| 6,594,074 B1 | * | 7/2003 | Wolleschensky et al. ... 359/385 |
| 2003/0223108 A1 | * | 12/2003 | Miyashita et al. .......... 359/389 |

FOREIGN PATENT DOCUMENTS

| JP | 07-120681 | 5/1995 |
| JP | 10-104523 | 4/1998 |
| JP | 2003-167197 | 6/2003 |

* cited by examiner

*Primary Examiner*—Thong Q Nguyen
(74) *Attorney, Agent, or Firm*—Pillsbury Winthrop Shaw Shaw Pittman LLP

(57) ABSTRACT

The invention provides a microscope having high utilization efficiency of light from a light source and capable of using a bright, uniform line illumination. The microscope includes a plurality of light sources; a collimator lens that substantially collimates light from the light sources; a cylindrical lens having a flat surface orthogonal to the optical axis of light emitted from the collimator lens, and a cylindrical surface whose longitudinal axis is disposed parallel to the arrayed direction of the light sources; and an objective lens that illuminates a specimen with light from the cylindrical lens.

1 Claim, 4 Drawing Sheets

MICROSCOPE

BACKGROUND OF THE INVENTION

1. Field of the Invention

The present invention relates to a microscope including a line illumination.

2. Description of the Related Art

Known microscopes including line illumination include, for example, those disclosed in Japanese Unexamined Patent Applications Publication Nos. HEI-7-120681, HEI-10-104523, and 2003-167197.

In the microscope disclosed in Japanese Unexamined Patent Application Publication No. HEI-7-120681, which includes a conventional incident-illumination optical system with a single light source, a cylindrical lens is inserted between an aperture stop and an objective lens, and a circular beam of light formed by the aperture stop is focused to a straight line by the cylindrical lens to form a line illumination. Some of the light from the light source is thus wasted.

In the microscope disclosed in Japanese Unexamined Patent Application Publication No. HEI-10-104523, optical fibers are arranged side-by-side to form a line-shaped light source, and the light from this light source passes through a slit to form a line illumination.

In the microscope disclosed in Japanese Unexamined Patent Application Publication No. 2003-167197, a plurality of slits are arranged near a light source, and the light beams passing through these slits form a line illumination serving as illumination light. This arrangement has high light utilization efficiency.

However, in the microscope disclosed in Japanese Unexamined Patent Application Publication No. HEI-7-120681, since a circular beam is focused to a straight line by the cylindrical lens, the illumination is elliptical. Furthermore, this microscope suffers from the problem of luminance variation at the central region and the peripheral region of the ellipse.

The microscope disclosed in Japanese Unexamined Patent Application Publication No. HEI-10-104523 suffers from the problem in that the optical fibers serving as the light source have low light utilization efficiency.

In the microscope disclosed in Japanese Unexamined Patent Application Publication No. 2003-167197, since only the light passing through the slits forms the line illumination, there is still a large amount of light that cannot pass through the slits, and therefore, the light utilization efficiency is not high enough.

BRIEF SUMMARY OF THE INVENTION

In light of the problems described above, an object of the present invention is to provide a microscope having high utilization efficiency of light from a light source and capable of using a bright, uniform line illumination.

In order to achieve the above-described object, the present invention provides the following solutions.

According to one aspect, the present invention provides a microscope including a plurality of light sources; a collimator lens that substantially collimates light from the light sources; a cylindrical lens having a flat surface orthogonal to the optical axis of light emitted from the collimator lens, and a cylindrical surface whose longitudinal axis is disposed parallel to the arrayed direction of the light sources; and an objective lens that illuminates a specimen with light from the cylindrical lens.

According to this aspect of the invention, since a plurality of light sources are used, the luminous flux incident on the collimator lens from the light sources are superimposed and a region where the intensity is high is widely distributed in the arrayed direction of the light sources. When the light from these light sources is collimated by the collimator lens, this collimated light also has a high-intensity region spread out in the arrayed direction of the light sources.

Then, the collimated light that is incident substantially vertically on the flat surface of the cylindrical lens does not experience refraction in the longitudinal-axis direction of the cylindrical surface, and is therefore emitted from the cylindrical lens with the same beam width. On the other hand, refraction along the optical path occurs at the surface orthogonal to the longitudinal axis, and the light is eventually focused to a straight line. The light focused to a straight line passes through the objective lens and is irradiated onto the specimen as line illumination.

In such a case, the longitudinal axis of the cylindrical surface of the cylindrical lens is disposed substantially parallel to the arrayed direction of the light sources. Therefore, a high-intensity region of the light beam is widely distributed in the longitudinal direction of the line illumination. Accordingly, it is possible to achieve a uniformly bright line illumination that is bright all the way to both ends thereof and having low luminance variation.

Also, since all of the light entering the collimator lens forms the line illumination, and the light directed towards the collimator lens from the light sources is not limited, the light utilization efficiency can be improved compared to a conventional case where, for example, only light incident via slits is used.

Furthermore, suitable light sources are compact light sources, including those producing rectilinear rays of light, such as LEDs and so forth, or a two-dimensional light-source image produced by a compact projection optical system. With such devices, the light utilization efficiency at the emission stage is better than light sources using optical fibers, for example.

In the aspect of the invention described above, the focal length of the cylindrical lens is preferably from 100 mm to 350 mm, inclusive.

If the focal length is less than 100 mm, the numerical aperture of the cylindrical lens is too large, which increases the spherical aberration, and therefore, it is not possible to achieve uniform illumination. If the focal length exceeds 350 mm, the overall length of the optical system becomes too great, which increases the size of the apparatus.

In the aspect of the invention described above, the collimator lens preferably includes at least one compound lens.

With this configuration, chromatic aberration can be corrected by adjusting the refractive indexes and the radii of curvature of the coupling surfaces of the lenses constituting the compound lens. Therefore, a sharper line illumination can be achieved.

The term "compound lens" used herein means a lens in which a plurality of single lenses are disposed next to each other. Therefore, this term includes lenses that are bonded to each other or air-contact lenses.

In the aspect of the present invention described above, the cylindrical lens is preferably insertable in and removable from the optical path of the collimated light.

With this configuration, removing the cylindrical lens makes collimated light from the collimator lens incident on the objective lens, and therefore, Koehler illumination can be achieved. Thus, by making the cylindrical lens removable, it is possible to suitably select either line illumination or Koehler illumination, which widens the range of possible applications of the microscope.

According to the present invention, a high-intensity region of a light beam is widely distributed in the longitudinal direction of a line illumination formed by the cylindrical lens. This affords an advantage in that it is possible to achieve a uniformly bright line illumination that is bright all the way to both ends thereof and having little variation in luminance.

DETAILED DESCRIPTION OF THE INVENTION

Figure 1:
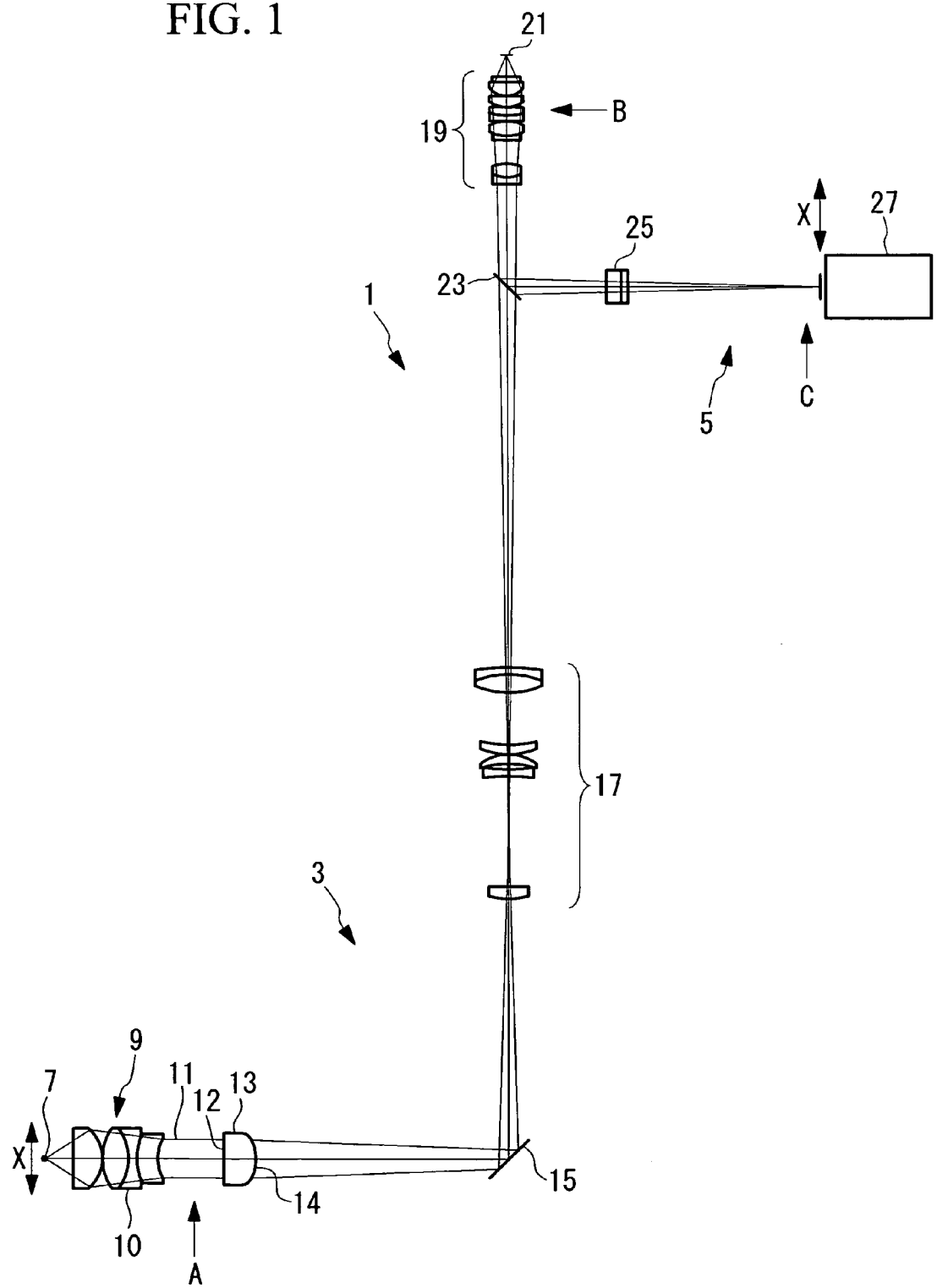
FIG. 1 is a schematic diagram of a microscope according to an embodiment of the present invention.

A microscope according to an embodiment of the present invention will be described below with reference to FIG. 1 to FIG. 4

A microscope 1 according to this embodiment is designed to be capable of operating with line illumination and Koehler illumination.

The microscope 1 according to this embodiment includes an illumination optical system 3 and an imaging system 5.

The illumination optical system 3 is provided with a plurality of light sources 7, a collimator lens 9 for converting light from the light sources 7 into a substantially collimated beam, a cylindrical lens 13 disposed in an optical path 11 from the collimator lens 9, a mirror 15 for changing the direction of the optical path 11, a relay lens 17, and an objective lens 19.

The light source 7 is considered to be a point light source for the sake of convenience. Four light sources 7 are arranged in a row in the Y direction (the direction perpendicular to the plane of the drawing in FIG. 1; see FIG. 2) with gaps of 0.2 mm therebetween. The light sources 7 are arranged symmetrically on either side of the optical axis.

The number of light sources 7 and the gaps therebetween are not limited to the values shown in this embodiment; they may be set arbitrarily, as required.

Also, a two-dimensional image formed by a compact projection optical system may serve as the light sources.

A doublet 10, that is, a compound lens, is provided in the collimator lens 9. The doublet 10 is designed such that chromatic aberration is eliminated by suitably adjusting the refractive indexes and the radii of curvature of the coupling surfaces of the convex lens and the concave lens from which it is constituted.

The collimator lens 9 formed of a plurality of lenses, including the doublet 10, is formed so as to convert the light incident from the light sources 7 into substantially collimated light.

The cylindrical lens 13 is disposed such that a flat surface 12 thereof is perpendicular to the optical path 11 from the collimator lens 9 and the longitudinal axis of a cylindrical surface 14 is parallel to the Y-axis. Accordingly, the cylindrical lens 13 exhibits refraction in the X direction (see FIG. 1), but exhibits no refraction in the Y direction.

The cylindrical lens 13 can be inserted in and removed from the optical path 11.

The mirror 15 is for deflecting the luminous flux from the cylindrical lens 13 towards the objective lens 19.

The relay lens 17, which relays an image formed by the cylindrical lens 13 to the objective lens 19, is disposed between the mirror 15 and the objective lens 19.

The objective lens 19 is formed by combining a plurality of lenses, and is designed to irradiate a specimen 21 with light traveling along the optical path 11, to serve as illumination therefore, and also to transmit reflected light from the specimen 21 toward the imaging system 5.

A half-mirror 23, an imaging lens 25, and an imaging device 27 are provided in the imaging system 5.

The half-mirror 23 is disposed in the optical path 11 and is configured so as to guide reflected light from the objective lens 19 to the imaging lens 25. The half-mirror 23 may be a dichroic mirror.

The imaging lens 25 is configured so as to focus reflected light from the half-mirror 23 onto the surface of the imaging device 27.

The imaging device 27 is, for example, a CCD and converts the light focused onto the surface thereof into an electrical signal, which is then processed.

The operation of the microscope 1 according to this embodiment, having this configuration, will now be described below.

First, line illumination will be described using FIGS. 1, 2A, 2B, 2C and 4.

In line illumination, the cylindrical lens 13 is placed in the optical path 11.

Figure 2A:
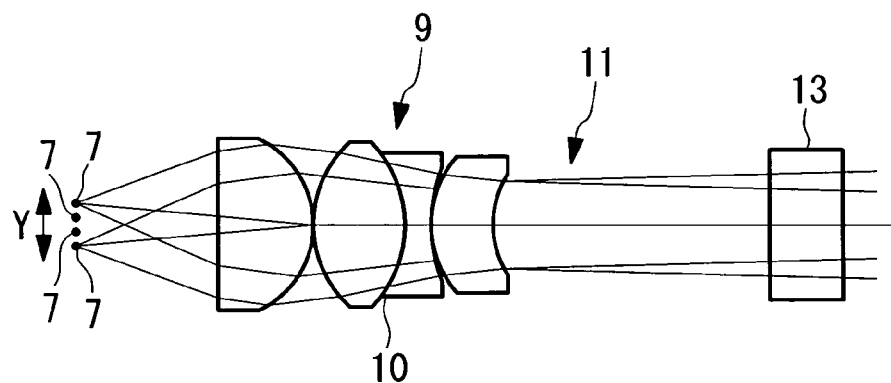
FIG. 2A is a close-up view of A in FIG. 1.
Figure 2B:
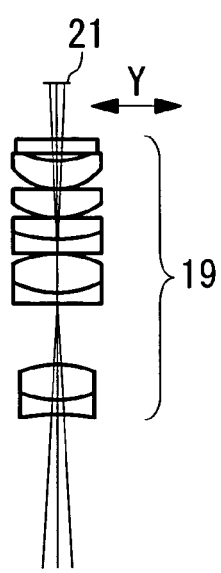
FIG. 2B is a close-up view of B in FIG. 1.
Figure 2C:
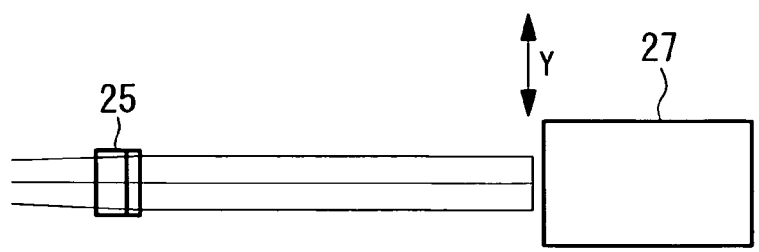
FIG. 2C is a close-up view of C in FIG. 1.

FIG. 1 shows a ray diagram in the X direction. FIGS. 2A, 2B, and 2C show partial ray diagrams in the Y direction.

The light generated in the light sources 7 is superimposed and incident on the collimator lens 9. This light is converted into substantially collimated light in the collimator lens 9, and is emitted towards the cylindrical lens 13.

Since the light sources 7 are disposed side-by-side in a line in the Y-direction, a high-intensity region of the light incident on the collimator lens 9 is widely distributed in the Y-direction. As a result, the high-intensity region of the collimated light emitted from the collimator lens 9 is also widely distributed in the Y-direction.

The collimated light incident on the cylindrical lens 13 is not refracted in the Y-direction (see FIG. 2A) but is refracted only in the X-direction (see FIG. 1). Therefore, the beam width in the Y-direction remains constant and the beam width in the X-direction is reduced as the beam propagates along the optical path 11.

The light is then reflected at the mirror 15, is deflected towards the objective lens 19, and is focused in a line parallel to the Y-direction in the middle of the relay lens 17, in other words at the focal position of the cylindrical lens 13.

The focal length of the cylindrical lens 13 is preferable from 100 mm to 350 mm, inclusive. If the focal length of the cylindrical lens 13 is less than 100 mm, the numerical aperture of the cylindrical lens 13 becomes too large, resulting in excessive spherical aberration, and therefore, uniform illumination cannot be obtained. If the focal length of the cylindrical lens 13 is longer than 350 mm, the overall length of the optical system becomes too long, and the apparatus thus becomes too large. In this embodiment, the focal length of the cylindrical lens 13 is 220 mm, for example.

Thereafter, as shown in FIG. 1, the beam width in the X direction increases, and the beam is incident on the objective lens 19 and is focused onto the surface of the specimen 21 by the objective lens 19.

On the other hand, as shown in FIG. 2B, in the Y direction, after being focused in the middle of the objective lens 19, the light beam is expanded and illuminates the surface of the specimen 21.

With this configuration, an extended line illumination in the Y-direction is provided at the surface of the specimen 21.

In this case, in the collimated light from the collimator lens 9, since the region where the intensity is high is widely distributed in the Y direction, the line illumination extending in the Y is bright all the way to the ends thereof, and it is possible achieve uniform brightness with little luminance variation.

Figure 4:
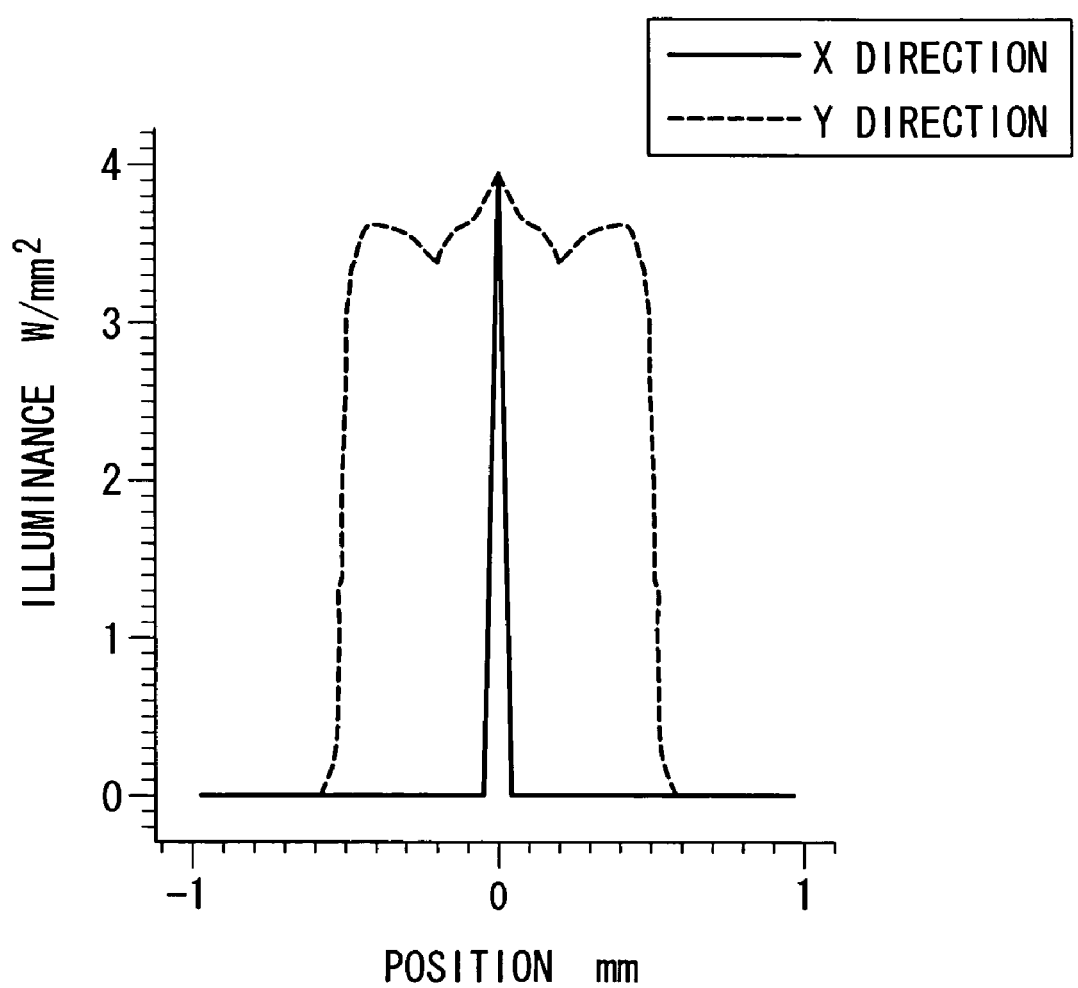
FIG. 4 is a graph showing the intensity distribution at a specimen surface when illuminated by line illumination of the microscope according to the embodiment of the present invention.

FIG. 4 shows the luminance distribution, in the X and Y directions, at the surface of the specimen when illuminated by the line illumination of this embodiment. From this figure, it is clear that a sufficiently uniform brightness in the Y direction can be obtained in practice.

Also, since all of the light entering the collimator lens 9 can all be converted to line illumination, and the light directed towards the collimator lens 9 from the light sources 7 is not limited, the light utilization efficiency can be improved compared to the conventional case where, for example, only light incident via slits is used.

Reflection light that is reflected from the specimen illuminated with the line illumination passes through the objective lens 19, is reflected by the half-mirror 23, and is imaged onto the surface of the imaging device 27 by the imaging lens 25. The image formed on the surface of the imaging device 27 is focused in the X direction, as shown in FIG. 1, and has a certain length in the Y direction, as shown in FIG. 2C; that is to say, it has a line shape that extends in the Y direction.

Next, Koehler illumination will be described using FIG. 3.

Figure 3:
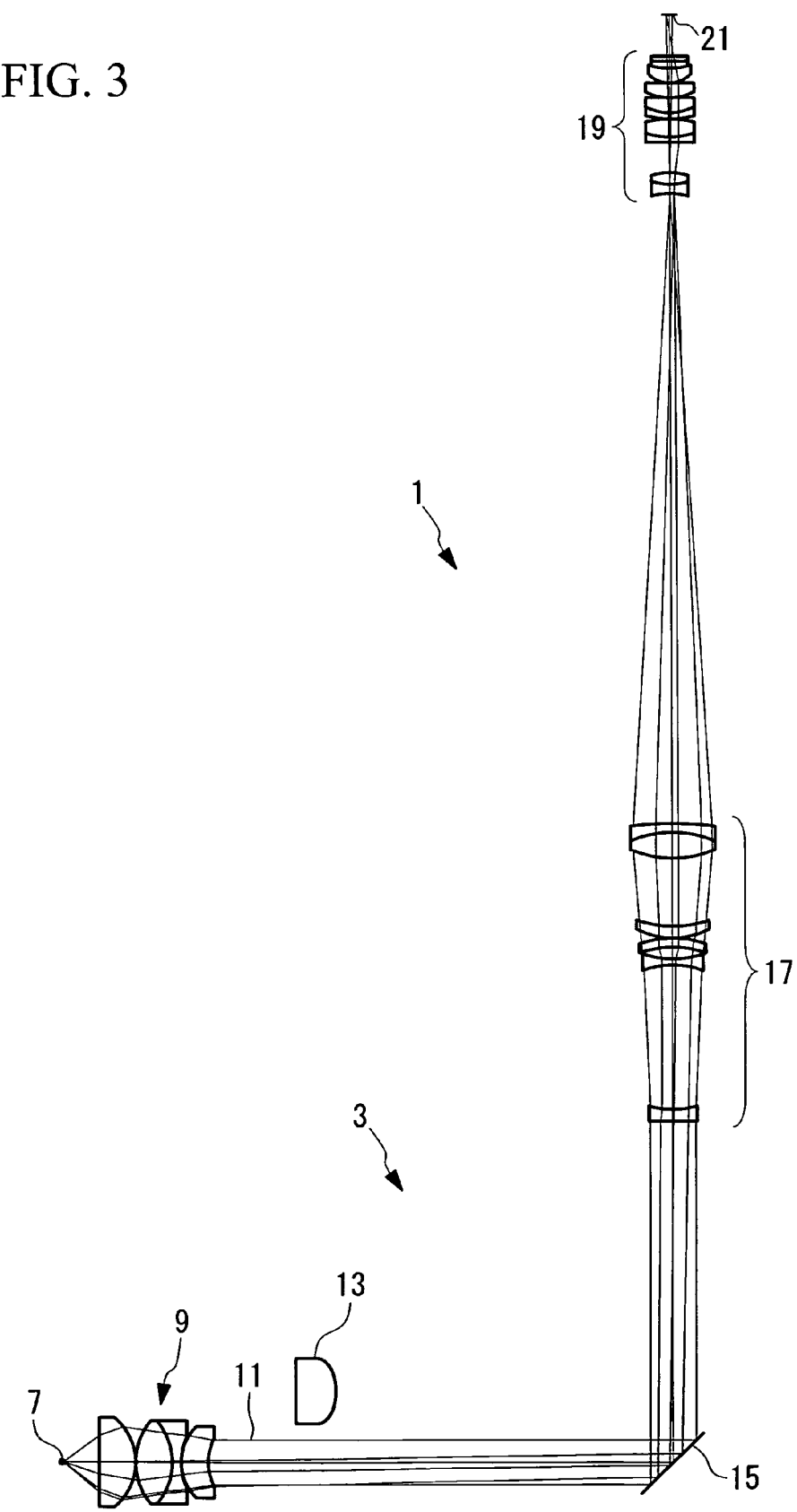
FIG. 3 is a schematic diagram showing a microscope according to the embodiment of the present invention using Koehler illumination.

In Koehler illumination, the cylindrical lens 13 is removed from the optical path 11, as shown in FIG. 3.

In such a case, the light generated in the light sources 7 is superimposed, is incident on the collimator lens 9, and is converted to substantially collimated light in the collimator lens 9.

This collimated light, whose cross-section is circular and thus has no directionality, is then reflected at the mirror 15 and is deflected towards the objective lens 19. Then, the collimated light passes through the relay lens 17 and is focused at the middle of the objective lens 19, as shown in FIG. 3. Thereafter, light is expanded and irradiated onto the surface of the specimen 21 as circular illumination.

In this way, it is possible to change from line illumination to Koehler illumination simply by removing the cylindrical lens 13. That is, since either line illumination or Koehler illumination can be suitably used by inserting and removing the cylindrical lens 13 to and from the optical path 11, the possible range of applications of the microscope can be expanded.

When Koehler illumination is selected, it is preferable that a single light source 7 be positioned on the optical axis. Therefore, the microscope may be designed so that it can switch between one light source 7 on the optical axis and a plurality of light sources 7 arranged side-by-side in the Y-direction, as in this embodiment.

Furthermore, instead of the cylindrical lens 13, providing a rotationally symmetrical lens having the same focal length as the cylindrical lens allows critical illumination to be realized, that is, an illumination condition where the light source is imaged at the surface of the specimen.

What is claimed is:

1. A microscope, comprising:

a plurality of light sources;

a collimator lens that substantially collimates light from the light sources;

a cylindrical lens having a flat surface orthogonal to the optical axis of light emitted from the collimator lens, and a cylindrical surface whose longitudinal axis is disposed parallel to the arrayed direction of the light sources; and an objective lens that illuminates a specimen with light from the cylindrical lens; wherein the cylindrical lens can be inserted in and removed from the optical axis of the collimated light.

* * * * *